United States Patent Office 3,716,466
Patented Feb. 13, 1973

3,716,466
THIOESTER CROSS-LINKING AGENTS
Edwin O. Hook, Marshfield, Mass., assignor to Moleculon Research Corporation, Cambridge, Mass.
No Drawing. Filed Dec. 22, 1969, Ser. No. 887,366
Int. Cl. C08f 1/24, 27/06
U.S. Cl. 204—159.17                     12 Claims

ABSTRACT OF THE DISCLOSURE

New thioester cross-linking monomers and methods of increasing cross-linking and oxidation resistance through their addition to various polymeric materials.

BACKGROUND OF THE INVENTION

This invention is directed to a new group of cross-linking monomers, which also impart antioxidant properties to the polymers in which they are incorporated, and to an improved method for cross-linking and imparting antioxidant properties to a variety of polymers, including polymers in shaped articles and other fabricated forms.

For many purposes it is advantageous to create physical cross-linking in the structure of a normally linear and thermoplastic polymer. The dimensional stability of the polymer, particularly against thermal shrinkage and distortion, can usually be enhanced in this manner. Cross-linking may also augment the chemical resistance of the polymer, especially against the action of various solvents. It may additionally serve to modify significantly the physical characteristics of the polymer or shaped articles made therefrom. For example, a given polymeric composition that normally is relatively flexible or elastic can often be stiffened considerably by cross-linking the polymer. This stiffening can often be accomplished after the polymer has been formed into a shaped article. Thus, a thermoplastic polymer can be fabricated by conventional techniques such as molding or extrusion while in an easily workable, plastified condition, and later can be expediently cross-linked to produce a desirably stiff, rigid and high melting shaped or molded article.

In the method of the present invention the use of high energy radiation to induce cross-linking eliminates the use of high temperatures which may favor or induce the decomposition of the polymer. Furthermore, the cross-linking to a relatively stable physical form can be accomplished at almost any desired rate and temperature and at the most convenient and desirable stage in the fabrication or production process. In this way, the use of relatively simple fabricating equipment is made quite practical. Furthermore, when high energy radiation is employed, it is not necessary to incorporate catalysts in the plastified composition to accomplish the intended results. As a result, most of the plastified compositions may be stored for long periods of time and may be worked at relatively elevated temperatures without adverse effect as long as these temperatures are below the thermal polymerization levels. In isolated instances, it may be beneficial to utilize polymerization inhibitors when the cross-linking monomer is susceptible to thermal polymerization at low temperatures. This, however, is an extraordinary requirement in the practice of the invention.

In contrast to the above, prior art methods of carrying out the cross-linking or curing step have typically required either long dwell times in molds at elevated temperatures to complete the cure or the processing of sensitive mixtures containing reactive catalysts and curing agents on an exacting time and temperature schedule in order to prevent pre-cure or "scorching." Furthermore, increased quantities of antioxidants and stabilizers have often been required to counteract the deleterious effects of residual catalysts or their decomposition products, with attendant increases in cost. This has been the case even in methods using radiation to initiate cure; here, too, interference of many antioxidants with the radiation-induced free-radical curing reaction has often had the effect of increasing the required radiation dose. By contrast, the compounds of the present invention combine in the same molecule a significant antioxidant effect with an ability to promote cross-linking under irradiation or in the presence of non-peroxide catalysts.

The major purpose of the present invention is to provide a greatly improved method for efficiently and effectively cross-linking (or "vulcanizing" or "curing") various synthetic polymer compositions. It is of additional significance that the cross-linking monomers of the present invention also enhance the antioxidant properties of the polymers into which they are incorporated. Thus, unexpectedly, two beneficial results, cross-linking and increased resistance to oxidation, are obtained as a result of incorporating the cross-linking monomers into polymer compositions.

It is a further advantage of the present invention that the thioester compounds can be caused to polymerize with various comonomers or with each other, i.e., one species of the thioester group may polymerize with other members of the same species of thioester or with other species of the thioester group. The polymers obtained from the polymerization of the thioesters and the polymerization of the thioesters and other polymerizable monomers can be fabricated into a variety of articles by standard fabrication techniques for example, they can be cast into films, molded, extruded, etc.

Various specific objects and purposes of the invention, as well as its many salutary features, benefits and advantages, are readily manifest and discernible throughout the ensuing description and specification.

GENERAL DESCRIPTION OF THE INVENTION

The present invention is directed to a method for increasing the cross-linking, and oxidation resistance of synthetic polymers, comprising mixing a thioester-type cross-linking monomer with a synthetic polymer or comonomer that is in substantially non-cross-linked form, and thereafter effecting non-peroxide-induced free-radical polymerization of the mixture. In addition, the present invention is directed to a group of new thioester cross-linking monomers and various cross-linked polymeric compositions. As employed in the present specification and claims, the term "comonomer" includes the same or other species of the thioester group as well as other polymerizable comonomers.

The free-radical polymerization generally can be induced by known means for generating free radicals that do not involve peroxide-type free-radical initiators. The peroxide-type free-radical initiators are not effective with the cross-linking monomers of the present invention. In a preferred procedure, the free-radical polymerization is effected by exposing the intimately mixed polymer or comonomer and cross-linking monomer to a field of high energy radiation. However, the free-radical polymerization can also be induced through the addition of a non-peroxide type, free-radical-producing chemical agent to the polymer/cross-linking monomer blend and the subsequent activation of this initiating agent by the application of heat to the blend.

Using the method of the present invention, shaped polymeric articles are fabricated by forming a composition comprised of a synthetic polymer or comonomer, thioester cross-linking monomer and non-peroxide free-radical initiator, if one is employed, into the desired structure and then effecting free-radical graft polymerization to cross-link the synthetic polymer. This is extremely useful in the production of various articles of manufacture which are comprised of the beneficially cross-linked polymer compositions that have been formed while the composition is in a suitably low melting and plastified condition for its optimum workability.

In the method of the present invention, the term "polymer" as employed in the present specification and claims refers to synthetic polymeric materials such as polyvinyl chloride, copolymers of vinyl chloride with other unsaturated monomers, polyethylenes such as the branched low density (about .910 to about .925) polyethylenes having melting points in the range of 90–110° C., medium and linear high density polyethylenes made by the Ziegler and Phillips processes; polypropylene and other olefin polymers and copolymers; natural and synthetic rubbers such as cis-polybutadiene, polyisoprene, and copolymers of butadiene with styrene and acrylonitrile; polyesters such as alkyd resins and polyacrylates and polymethacrylates; nylons such as the aliphatic nylons 6, 6/6, 6/10, 12 new aromatic nylons including the polyamide of terephthalic acid and a mixture of 2,2,4- and 2,4,4-trimethylhexamethylenediamines, and such experimental nylons as nylon 13/13 and nylon 9; and styrene homopolymers and copolymers such as styrene-acrylonitrile and ABS resins. Comonomers other than thioesters to be employed in the present invention include diallyl phthalate, diallyl succinate, styrene, acrylic esters and acrylonitrile. The thioesters when polymerized with these comonomers, in addition to producing cross-linking and increased oxidation resistance, will produce a resin tougher than the corresponding homopolymer by decreasing the modulus of elasticity, and increasing the impact resistance and breaking elongation.

The thioester cross-linking monomers useful in the method of the present invention possess at least two functional groups containing reactive ethylenic double bonds and are characterized by having a thioether link in a position beta to at least one of the ester carbonyls. The thioester compounds useful in the present invention include those thioester compounds corresponding to one of the following formulae:

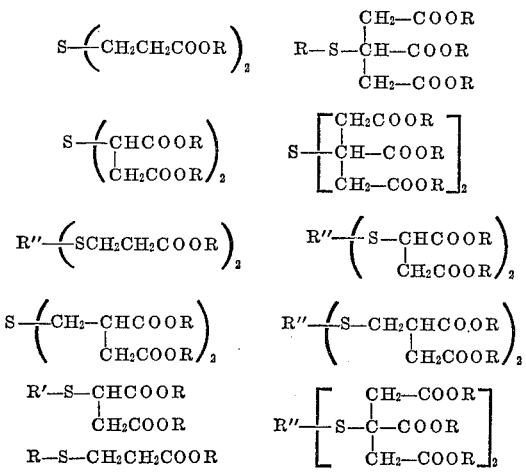

wherein R represents allyl, methallyl, ethallyl or vinyl; R' represents alkyl, aryl or R; and R" is alkylene or arylene. As employed in the present specification and claims, the terms "alkylene" and "arylene" represent bivalent hydrocarbon radicals having from 2 to 20 carbon atoms with the free valences being on separate carbon atoms. Representative alkylene and arylene moieties include ethylene, trimethylene, tetramethylene, 1,3-cyclopentylene, m-phenylene, o-phenylene or p-phenylene, m-cyclohexylene, p-cyclohexylene or o-cyclohexylene.

The cross-linking monomers that are employed most advantageously and are, therefore, preferred in the practice of the present invention are those which have been selected from the group consisting of the thioesters corresponding to one of the formulae:

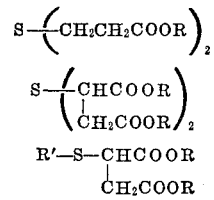

where R and R' have meanings as in the previous paragraph.

In carrying out the method of the present invention the thioester cross-linking monomer is thoroughly blended with the synthetic polymer or comonomer. Optimum results are obtained when the synthetic polymer is in a substantially uncross-linked state at the time the components are admixed. The synthetic polymer or comonomer and thioester cross-linking monomer are thoroughly blended by conventional blending techniques such as by the use of a differential roll mill, a Banbury mixer or other similar masticating equipment, or by "dry blending" the ester into the powdered polymer in a ribbon blender or suitable tumbling equipment. The temperature of the polymer/cross-linking monomer mixture during the blending procedure is not critical provided that the temperature is not high enough to cause degradation of the polymer or initiate thermal cross-linking. Optimum blending is obtained when the polymer is heated to a temperature above its second order transition temperature.

The amount of cross-linking monomer to be incorporated in the polymer or comonomer blend depends upon the specific nature and characteristics of the polymer to be cross-linked, the degree of cross-linking desired, the desired increase in oxidation resistance, the cross-linking potency under irradiation of the particular cross-linking agent that is involved, the transcient properties desired in the uncross-linked composition for purposes of fabrication and the final properties desired in the resulting cross-linked composition. Generally, the stiffness or rigidity of a cross-linked composition increases with the degree of cross-linkage. Hence, the quantity of the cross-linking monomer employed should be chosen to secure the desired extent of cross-linking and, therefore, stiffness in the polymeric composition without induction of excessive brittleness. Generally, a satisfactory result may be achieved when a minor proportion of the cross-linking monomer is intimately incorporated in the polymer. In some instances very small proportions of the thioester will suffice, especially when relatively low states of oxidation resistance and low levels of cross-linking are desired in the final product. It is possible, of course, to employ a large enough quantity of thioester monomer to produce an actual polymer solution (or dispersion) of high viscosity. Compositions of this nature may be desirable in particular instances for utilization as laminating or casting resin formulations.

Broadly speaking, it is desirable to utilize such a quantity of the monomer as may be adapted to provide at least one functional cross-linkage, and conveniently between one and say about 100 functional cross-linkages, per every 10,000 carbon atoms in the chains of the basic polymer. With this in view, it may frequently be found advantageous to incorporate an amount of the cross-linking monomer in the polymer that is between about 0.1 and 30 percent by weight, based on the weight of the resulting plastified composition. An amount that is between about 2 and 10 percent by weight may even be more advantageous for most purposes and is adapted to produce a wide range of physical properties and differences in oxidation resistance. Optimum oxidation resistance is obtained by employing the cross-linking monomer in an amount equivalent to from about 2 to about 5 percent by weight of the synthetic polymer. When employed with a comonomer other than another thioester, the proportions to be used will be determined by the properties desired in the final product.

As previously stated, the desired cross-linking or graft cross-linking is effected by initiating non-peroxide-induced free-radical graft polymerization between the cross-linking monomer and the synthetic polymer. Preferably this free-radical polymerization is induced by subjecting the plastic composition to high energy radiation.

The high energy radiation employed to cross-link the polymer composition must have an intrinsic energy greater than the typical electron binding energies of a few electron volts, and be capable of penetrating the processed materials. Such high energy and penetration is conveniently available as beta or gamma radiation from, for example, radioactive cobalt, nuclear reaction fission products and the like. However, if preferred, high energy radiation from such sources as electron beam generators, X-ray generators and the like may also be utilized with equivalent benefit. It will usually be expedient to employ a high energy radiation field having an intensity of at least 0.1 mrad per hour to avoid unduly long exposure times. Graft copolymerization or graft cross-linking, under the influence of high energy radiation, may advantageously and quite satisfactorily be conducted at normal room temperatures. Thus, the difficulties encountered in thermal cross-linking processes, with or without catalysts, are avoided.

The preferred radiation dosage to induce cross-linking is between about 1 and 20 mrads although a greater dosage may be utilized, if it is deemed necessary. Obviously, greater economic benefits accrue when low dosages are employed. Thus, in most cases, it is advantageous to employ a dosage of 1 to 5 mrads. This is not only economically feasible, but ordinarily produces optimum properties and achieves greatest benefit in the cross-linked products derived from the polymer compositions. Greatly excessive dosages should be avoided to prevent degradation or decomposition of the compositions being cross-linked, especially after all or substantially all of the cross-linking agent has become cross-linked in the polymer composition. For example, when certain vinyl chloride polymer compositions are treated with high energy radiation to dosages greater than about 5 mrads, the resin may become brittle and discolored.

In addition to high energy radiation, non-peroxide chemical free-radical initiators are employed to effect cross-linking in the present invention. Non-peroxide chemical free-radical initiators are well known in the art and can be employed in the present invention to obtain the desired cross-linking between the polymer and the cross-linking monomer. In general, the procedure followed for forming cross-linked polymers using chemical free-radical initiators is to compound the polymer or comonomer, free-radical initiator and cross-linking agent using conventional blending equipment such as Brabender Plastograph, Banbury Mixer or two-roll mill, at a temperature about 10–30° C. above the softening point of the polymer but below the gel point, for about 5–20 minutes. It is also possible to mix the reactants, preferably in particulate form, at temperatures below the softening point of the polymer, e.g. at 25° C., and thereafter heat the mixture above the softening point of the polymer to form a homogeneous mixture in the molten polymer. It is also sometimes preferred, especially where there is concern with premature cross-linking in the mixing or compounding step, to mix solely the polymer and the cross-linking monomer at temperatures at which the polymer is molten until a homogeneous mixture is obtained, e.g., about 10 minutes, and thereafter add the initiator with continued mixing for an additional 1–5 minutes. The polymer composition can then be shaped using standard methods and equipment into films, tubes, wire insulation, molded articles and the like. During the forming operation, sufficient heat can be applied to actuate the free-radical initiator and effect the cross-linking. In an alternate procedure, the free-radical polymerization and resultant cross-linking is accomplished by subsequently curing the shaped material in a mold at a temperature above its gel point.

Organic compounds capable of generating free radicals suitable for use in the present invention include azo compounds such as α,α′-azobis(isobutyronitrile), α,α′-azobis-(cyclohexanecarbonitrile); 2-phenylazo-2,4-dimethylvaleronitrile; 2-phenylazoisobutyronitrile; 2-phenylazoisobutyramide and the like.

When the thioester cross-linking monomers are employed with synthetic polymers or other polymerizable monomers, they can be used singly or in combination with other thioester compounds. It is only necessary that the "gel point" of the mixture be sufficiently high to enable shaping of the mixture in an extruder or other shaping mechanism at temperatures above the softening point of the mixture without cross-linking occurring.

The new thioester monomeric cross-linking agents of the present invention correspond to one of the formulae:

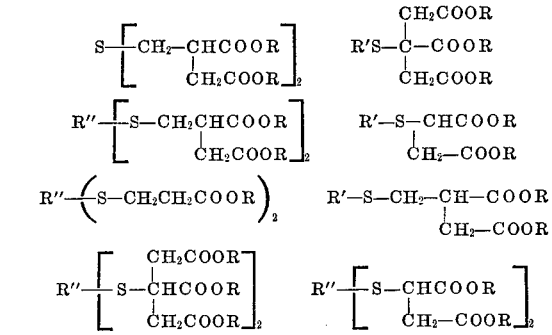

wherein R represents allyl, methallyl, ethallyl or vinyl; R′ represents allyl, methallyl, ethallyl, vinyl, alkyl or aryl; and R″ represents alkylene or arylene. The new cross-linking agents of the present invention are crystalline solids or oils and are only slightly soluble in water and soluble in various organic solvents such as ether, acetone, benzene and tetrahydrofuran.

The esters are prepared in accordance with well known procedures. The thioesters of the present invention corresponding to one of the formulae:

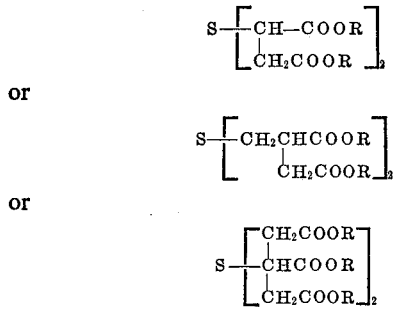

wherein R is as previously defined, can be prepared by reacting a diester of an α,β-unsaturated polycarboxylic acid corresponding to one of the formulae:

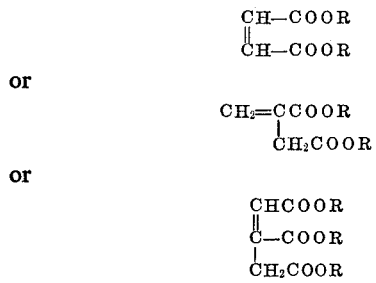

with hydrogen sulfide at a temperature of between 0° and 150° C. In a preferred embodiment, the reaction is carried out in the presence of a basic condensation catalyst such as an organic base, for example, piperidine; a secondary or tertiary aliphatic amine such as diethylamine; or trimethylbenzyl ammonium hydroxide. While the reaction proceeds rapidly in a liquid organic reaction medium which dissolves the ester starting materials and is inert with respect to the hydrogen sulfide, the use of such solvents as the reaction medium is not necessary. Representative solvents to be employed when desired include aromatic hydrocarbons such as benzene and ethers such as diethylether, tetrahydrofuran, dialkyl ethers of polyglycols, and dioxanes. Although the reaction may proceed slowly in the absence of a catalyst it is usually desirable to employ a catalyst in order to achieve commercially acceptable reaction rates in simple apparatus at atmospheric pressure; however, superatmospheric pressures can be employed in uncatalyzed or catalyzed reactions. Uncatalyzed reactions usually require the use of high temperatures and superatmospheric pressures in pressurized vessels. Following the reaction, the desired ester product is obtained by first removing the low boiling constituents such as solvents, unreacted starting material and other volatiles from the reaction mixture by fractional distillation under decreased pressure. The remaining reaction mixture can then often be distilled under high vacuum, to obtain a purified thioester product.

In another procedure, the new thioester cross-linking monomers of the present invention can be prepared by reacting allyl alcohol, methallyl alcohol, ethallyl alcohol or vinyl acetate with a thiopolycarboxylic acid corresponding to one of the formulae:

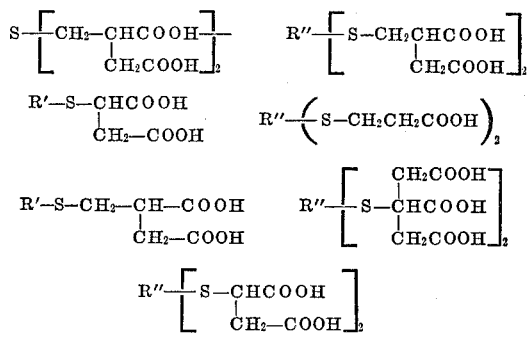

The esterification reaction proceeds rapidly with the production of the thioester product at temperatures in the range of from 60 to 150° C. The reaction is carried out in an inert organic solvent as reaction medium and in the presence of an esterification catalyst such as benzenesulfonic acid, sulfuric acid, hydrochloric acid or phosphoric acid.

In carrying out the reaction, the reactants are contacted in any order. While the proportion of the reactants is not critical, the allyl, methallyl, or ethallyl alcohol is employed in at least stoichiometric amounts with respect to the thiopolycarboxylic acid. After the reactants have been contacted the temperature of the reaction mixture is maintained in the reaction temperature range, and preferably at reflux temperature where the water formed during the reaction can be removed azeotropically. The reaction mixture is maintained at the reaction temperature until evolution of water substantially ceases, indicating that the reaction is substantially complete. Following the reaction period, the low boiling constituents of the reaction mixture such as the solvent or unreacted starting materials are removed by vacuum distillation to obtain the thioester product as a residue. Representative thiopolycarboxylic acid starting materials include thiodipropionic, thiodisuccinic, thiobis(tricarballylic), ethylenedithiodipropionic and allylthiosuccinic acids.

SPECIFIC EXAMPLES

Example 1

Thiodipropionic acid (178 g., 1 mole), allyl alcohol (174 g., 3 moles) and 200 cc. of benzene were charged to a 1-liter, 3-necked round bottom flask equipped with stirrer, thermometer, reflux condenser and water trap. About 1 gram of benzenesulfonic acid was added to catalyze the esterification and the mixture stirred and heated at reflux during the course of the reaction. Water formed in the reaction mixture and was removed azeotropically with benzene and separated from the distillate as a lower, aqueous layer in the water trap. The upper, benzene-rich layer was continuously returned to the reactor.

When water no longer separated from the distillate, the reaction mixture was stripped under water pump vacuum up to a temperature of 100° C. to remove benzene and excess allyl alcohol. The residue was cooled, taken up in ether and washed successively with cold water, cold dilute sodium carbonate solution (ca. 5%) and with small portions of cold water until the washings were neutral. The washed ether layer was then dried over anhydrous sodium sulfate and vacuum distilled to obtain the diallyl thiodipropionate product as a colorless oil having a boiling point of 153° C. at 1.5 mm. pressure.

Example 2

The methallyl ester was prepared from thiodipropionic acid (178 g., 1 mole), methallyl alcohol (216 g., 3 moles) and 200 cc. of benzene exactly as described above. The reaction, however, was slower and removal of water was more difficult. The dimethallyl thiodipropionate product boiling at 162–164° C. at 1 mm. pressure was obtained by vacuum distillation as described in Example 1.

Example 3

Following the procedure of Example 1 the esters listed in Table I below are prepared, using as starting materials the acids and alcohols shown in the table in the proportions indicated. The products in all cases are colorless to pale yellow mobile oils of low volatility. They are recovered in a sufficient degree of purity without vacuum distillation by removing the solvent from the reaction mixture under reduced pressure.

TABLE I

| | Acid | Gms. | Alcohol | Gms. | Product |
|---|---|---|---|---|---|
| (a) | Thiobis(tri-carballylic) | 38.2 | Allyl | 70 | Thiobis(triallyl tricarballylate). |
| (b) | 4-thia-1-heptene-6,7-dicarboxylic | 20.4 | Methallyl | 30 | Di(methallyl) 4-thia-1-heptene-6,7-dicarboxylate. |
| (c) | 4-thiaheptene-1,2,6,7-tetracarboxylic | 29.4 | ....do...... | 115 | Tetra(methallyl) 4-thiaheptane-1,2,6,7-tetracarboxylate. |
| (d) | Thiodisuccinic | 26.6 | Ethallyl | 70 | Tetra(ethallyl)thiodisuccinate. |
| (e) | Phenylthiosuccinic | 22.6 | Allyl | 30 | Diallyl phenylthiosuccinate. |
| (f) | 1-(pentachlorophenylthio)propane-2,3-dicarboxylic | 41.3 | ....do...... | 60 | Diallyl 1-(pentachlorophenylthio)-propane-2,3-dicarboxylate. |

The acid used in 3(a) is prepared in known manner by the base-catalyzed Michael addition of sodium sulfide to sodium aconitate; that used in 3(c) is similarly prepared from sodium sulfide and sodium itaconate. Those used in 3(b), 3(e) and 3(f) result from the analogous additions of allyl mercaptan to sodium itaconate, thiophenol to sodium maleate, and pentachlorothiophenol to sodium itaconate, respectively. The remaining acid is from commercial sources.

Example 4

Commercial thiodisuccinic acid (75.6 g., 0.28 mole), allyl alcohol (100 g., 1.74 mole) and 75 ml. of benzene were reacted together as in Example 1 using 1 ml. of benzenesulfonyl chloride as catalyst. When removal of the water of the reaction was complete (27.5 ml. of aqueous layer were collected in ca. 28 hours) and the original cloudy suspension had become a clear solution, the mixture was subjected to the work-up procedure described in Example 1. Removal of the solvent from the dried ether solution by distillation up to a pot temperature of 130° C. under a vacuum of 3 to 5 mm. yielded the product as a pale yellow oil; yield 116 g. (96% of theory). An infrared spectrum confirmed its identity.

Example 5

A commercial sample of carboxymethylthiosuccinic acid (104 g., 0.5 mole) was esterified with allyl alcohol (150 g., 2.5 moles) as in the preceding example, using 75 ml. of benzene as azeotroping agent and 1 ml. of benzenesulfonyl chloride to catalyze the reaction. After removal of water was complete (37 ml. of aqueous layer were collected in ca. 20 hours.), the product was isolated exactly as described above in Example 4. Triallyl 2-thiabutane-1,3,4-tricarboxylate was obtained as a pale yellow mobile oil; yield 159 grams (97% of theoretical). Infrared analysis was in agreement with the expected structure.

Example 6

To a 500-cc. three-necked round-bottom flask equipped with stirrer, thermometer and gas inlet and outlet tubes, were charged 100 ml. of bis(2-methoxyethyl)ether and 210 gm. of diallyl itaconate. One ml. of piperidine was added to catalyze the reaction, the mixture was heated to 60 degrees C., and hydrogen sulfide was slowly passed in below the surface of the stirred liquid. An exothermic reaction took place which maintained the pot temperature between 60 and 75° C. for some thirty minutes without any external heating. The mixture was then heated sufficiently to hold the temperature above 60° while passage of hydrogen sulfide was continued for an additional 60 minutes.

The mixture was cooled to room temperature and sufficient dilute hydrochloric acid added to neutralize the piperidine, after which the bis(2-methoxyethyl)ether was removed by stripping under reduced pressure. Distillation was continued to a pot temperature of 155° C. under a vacuum of 0.5 mm. mercury to remove unreacted diallyl itaconate (B.P. 80–105° C./0.5 mm). When no further volatile material came over, the residue was cooled to room temperature and removed from the still. The resulting amber-colored oil, obtained in a yield of 70 grams, was tetraallyl 4-thiaheptane-1,2,6,7-tetracarboxylate; percent sulfur: found 7.5%, theory 7.0%.

Example 7

In the same manner as in Example 4, a solution of 196 grams of diallyl maleate in 100 ml. of bis(methoxyethyl) ether was treated with hydrogen sulfide, using 1 ml. of piperidine as catalyst. The product was obtained as a dark amber oil which did not vacuum distill below 220° C. (pot temperature) at a pressure of about 0.5 mm.

Example 8

Divinyl thiodipropionate is prepared from 36 gm. (0.2 mole) of thiodipropionic acid and 206 gm. (2.4 moles) of vinyl acetate by the procedure described in Organic Syntheses, Collective Volume IV, pp. 977–9. Alternatively, the divinyl ester can be made from vinyl methyl ether in the presence of phosphorus pentoxide as described in Izvest. Akad, Nauk SSSR Otdel. khim. Nauk 556 (1953) by Shostakovskii, Mikhant'ev, and Ovchinnikova (Ca 48:9913c). The product is isolated by vacuum distillation at below 1 mm. pressure as a colorless mobile oil.

The above product is incorporated into a polyvinyl chloride compound by the dry-blending technique as described in Example 11, at a level of 5 phr. The resulting blend is extruded into rod as described in Example 11, using extruder temperatures of 130–140° C. After irradiation of the samples (2–5 mrads) in a cobalt-60 source, the material is found to be extensively cross-linked, as evidenced by increased softening temperature and insoluble gel fractions of 75% to over 90%. Percent gel is measured by exhaustive extraction of weighed samples in tetrahydrofuran to remove soluble material, followed by drying and reweighing. Unirradiated samples of the same material dissolve almost completely in tetrahydrofuran.

Example 9

Each of the products described in Examples 3, 4 and 5 above is blended with nylon-12 at a level of 10 phr. Blending is accomplished by tumbling the mixture of nylon molding pellets and cross-linking monomer in a suitable container on a set of rolls for 30–60 minutes, or until the pellets are uniformly coated with the oily monomer. The blends are then charged to an extruder and processed into rod, using extruder temperatures of 380–420° F. Samples of the rod, after irradiation to a dose of 5 mrads, are found to show increases in softening temperature and elastic modulus (especially at elevated temperatures) when compared to unirradiated controls. On exhaustive extraction with meta cresol at 100° C., insoluble gel contents of 60–80% are found, compared to values of less than 1.5% for unirradiated controls. When samples of the irradiated rods are compared with similar irradiated samples containing sulfur-free cross-linking agents (triallyl cyanurate, trimethylolpropane trimethacrylate, diallyl phthalate) in accelerated aging tests as in Example 13 superior retention of physical properties is observed.

Example 10

Diallyl thiodipropionate, at a level of 5 phr., is incorporated into the following polymers by milling on a heated two-roll mill or masticating in a Banbury mixer: polypropylene, low- and high-density polyethylene, ethylene-propylene rubber, an ethylene/vinyl acetate copolymer, poly(ethyl acrylate), a commercial ABS resin, and an impact grade of polystyrene. The products, in the form of molded test bars, are irradiated to a dose of 3 mrads in a cobalt-60 source. All samples show increases in softening temperature, elastic modulus, and gel content after extraction with suitably chosen solvents. Also, all give evidence of improved oxidation resistance when subjected to accelerated aging tests.

Example 11

Diallyl thiodipropionate (40 grams) was blended with 400 grams of a medium impact polyvinyl chloride compound by heating the polyvinyl chloride to about 50° C. and slowly adding the diallyl thiodipropionate. During the blending procedure, the diallyl thiodipropionate monomer sorbed into the polyvinyl chloride powder with the mixture tending to become somewhat plastic and then a free flowing powder again. The entire mixture was then extruded in rod form through a Brabender extruder at temperatures ranging from 135° to 185° C. A series of various samples of the rod were collected and exposed to different quantities of high energy radiation from a cobalt-60 source. A control of unmodified polyvinyl chloride was also extruded into a rod of identical dimension. The irradiated samples and the control were then tested using standard ASTM test methods and the results are as follows:

TABLE II

| Sample | Irradiation dosage, mrad | Test results | | |
|---|---|---|---|---|
| | | Elastic modulus, p.s.i. | Tensile, p.s.i. | Elongation, percent |
| A | None | 250,000 | 8,500 | 136 |
| B | 1.5 | 207,000 | 5,600 | 220 |
| C | 3.0 | 274,000 | 6,900 | 273 |
| D | 5.0 | 287,000 | 5,900 | 205 |

Example 12

In a similar operation a series of samples were prepared in which 72 grams of either diallyl thiodipropionate (DATP) or dimethallyl thiodipropionate (DMATP) were admixed with 500 grams of the same medium impact polyvinyl chloride compound as employed in Example 1. The polymeric material was extruded and irradiated as described in Example 11. As a result of these operations, the following data were obtained:

TABLE III

| Sample | Irradiation dosage (Mrad) | Thioester monomer | Modulus | Tensile | Elongation |
|---|---|---|---|---|---|
| 1 | None | None | 250,000 | 8,500 | 136 |
| 2 | 1.5 | DATP | 230,000 | 4,800 | 336 |
| 3 | 1.5 | DMATP | 250,000 | 5,300 | 468 |
| 4 | 3.0 | DATP | 284,000 | 6,000 | 419 |
| 5 | 3.0 | DMATP | 333,000 | 7,000 | 350 |
| 6 | 5.0 | DATP | 268,000 | 6,100 | 209 |
| 7 | 5.0 | DMATP | 341,000 | 7,200 | 230 |

A sample of the rod submitted to 5 mrads of irradiation was tested to determine softening point and flattening point using a modified Fisher-Johns technique (ASTM). During this operation, the temperature rise was 10° per minute rather than a controllable rate that could be slowed at the melting point. The unmodified polyvinyl chloride compound softened at 150° C. and was flattened at 175° C. The rods containing 10% and 15% diallyl thiodipropionate exhibited very slight softening at 200° C. Neither rod flattened at up to 300° C. A rod containing 15% dimethallyl thiodipropionate began softening at about 180° C. but did not flatten up to 300° C.

Example 13

Diallyl thiodipropionate (16 grams) was blended with 400 grams of nylon 12 by tumbling the mixture in a container on a set of rolls for 40 minutes. The composition was then extruded from a Brabender Plasti-Corder in rod form and irradiated to 5 mrads. The gel content of the irradiated sample was 71–72% and a modified Fisher-Johns test showed a very slight softening at about 170° C. which continued up to 250° C. The nylon 12 containing allyl thiodipropionate showed no appreciable color change during the test. In a control, unmodified nylon 12 showed softening at 160° C.

Samples of the above nylon 12 composition, irradiated at 5 mrads, were aged for periods up to 72 hours in a circulating air oven at 170° C., along with exactly similar samples containing commercial cross-linking monomer plus antioxidant [triallylcyanurate (TAC) plus dilauryl thiodipropionate (DLTP)]. Results in Table IV demonstrate the improved resistance of the composition containing the diallylthiodipropionate cross-linker to thermal and oxidative degradation even in the absence of any added antioxidant.

TABLE IV.—AGING TEST RESULTS
(170° C. air oven)

| Sample No. | Composition | Aging time (hrs.) | Elongation, percent At break | Retention | Breaking load, kg. |
|---|---|---|---|---|---|
| 57 | Nylon 12 plus 4% TAC, 1% DLTP. | 0 | 245 | | 5.0 |
| 57 | do | 24 | 20 | 8 | 3.75 |
| 57 | do | 48 | 10.5 | 4 | 4.5 |
| 57 | do | 72 | 5 | 2 | 3.6 |
| 6 | Nylon 12 plus 4% DATP.[1] | 0 | 219 | | 5.8 |
| 6 | do | 24 | 31 | 14 | 5.7 |
| 6 | do | 48 | 36 | 16 | 6.0 |
| 6 | do | 72 | 8 | 4 | 5.0 |

[1] Diallyl thiodipropionate.

Example 14

Diallyl thiodipropionate was mixed with comonomers of the nature and in the amounts in Table V. These amounts correspond to a proportion of two moles of comonomer for each mole of diallyl thiodipropionate. As polymerization initiator, 0.1 gm. of azodiisobutyronitrile was added to each mixture. The containers were then flushed with nitrogen, stoppered, and placed in an oven at 65° C.

In experiments A and B polymerization was substantial in as little as 1 hour, as indicated by solidification of the liquid mixture to a clear gel; experiments C and D required somewhat longer. The mixtures were allowed to remain in the oven for a total of 66 hours to insure complete reactions. At the end of this time the products were clear, colorless to pale yellow, rubbery gels.

Small samples were removed for percent gel determination, after which the products were heated in a vacuum oven at 125° C. for 18 hours to remove any unreacted monomers. Percent gel was measured by extracting weighed samples for 18 hours with excess tetrahydrofuran, drying and re-weighing. Results (see Table VI) indicate a relatively high conversion to polymer in all cases. Cross-linking was extensive when ethyl acrylate or diethyl fumarate were used as comonomers, and substantial when the diallyl thiodipropionate was used alone.

TABLE V

| Experiment number | Grams | | | |
| | Diallyl thiodipropionate | Ethyl acrylate | Methyl methacrylate | Diethyl fumarate |
|---|---|---|---|---|
| A | 6.5 | 5.0 | | |
| B | 6.5 | | 5.0 | |
| C | 6.5 | | | 8.6 |
| D | 6.5 | | | |

TABLE VI

| Experiment number | Comonomer | Degree of conversion (percent non-volatile) | Cross-linking[1] (percent gel) |
|---|---|---|---|
| A | Ethyl acrylate | 92 | 80 |
| B | Methyl methacrylate | 94 | 5 |
| C | Diethyl fumarate | 75 | 80 |
| D | None | 95 | 32 |

[1] Corrected for volatiles loss.

Example 15

Dimethallyl thiodipropionate, 1.5 gm., was mixed with 6.7 gm. of methacrylonitrile (these amounts correspond to a molar ratio of 1 mole dimethallyl thiodipropionate per 10 moles comonomer), and the mixture polymerized as above in Example 14, using a 0.1 gm. azodiisobutyronitrile as initiator. The product was obtained as a hard, clear amber resin. Conversion and cross-linking, measured as in Example 12, were 82% and 24%, respectively.

A similar experiment, using 6.5 gm. diallyl thiodipropionate and 2.7 gm. acrylonitrile (molar ratio 1:2) resulted in vigorous polymerization.

I claim:
1. The process of preparing a cross-linked polymer, which process comprises:
(a) providing a cross-linkable polymer composition by blending a thiopolycarbonyl ester cross-linking monomer, or a mixture of monomers, with a polymer capable of being cross-linked with the monomer, the monomer selected from the group consisting of one of the formulae:

$$S{-}(CH_2CH_2COOR)_2$$

$$R{-}S{-}\underset{\underset{CH_2{-}COOR}{|}}{\overset{CH_2{-}COOR}{\underset{|}{CH}{-}COOR}}$$

$$S{-}\left(\underset{CH_2COOR}{\overset{|}{CHCOOR}}\right)_2$$

$$R''{-}(SCH_2CH_2COOR)_2 \qquad S{-}\left(\underset{CH_2{-}COOR}{\overset{CH_2{-}COOR}{\underset{|}{CH}{-}COOR}}\right)_2$$

$$S{-}\left(\underset{\underset{CH_2COOR}{|}}{CH_2{-}CHCOOR}\right)_2$$

$$R'{-}S{-}\underset{CH_2COOR}{\overset{|}{CHCOOR}} \qquad R''{-}\left(\underset{CH_2COOR}{\overset{S{-}CHCOOR}{|}}\right)_2$$

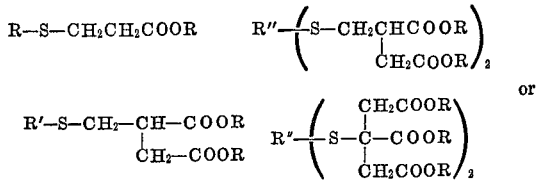

wherein R represents allyl, methallyl, vinyl or ethallyl; R' represents allyl, methallyl, ethallyl, vinyl, alkyl or aryl; and R" represents alkylene or arylene, the polymer composition being free of a peroxide free-radical initiator compound, the monomer present in an amount ranging from about 0.1 to 30% by weight of the polymer composition; and, thereafter,
(b) cross-linking the polymer in the polymer composition with the thioester monomer, the cross-linking being effected by exposing the polymer to ionizing radiation in the amount of from 1 to 20 megarads at a dosage rate of at least 0.1 megarads per hour.

2. The process of claim 1 which includes cross-linking the polymer in the polymer composition by exposing the polymer to ionizing radiation in the amount of from 1 to 5 megarads.

3. The process of claim 1 wherein the polymer of the polymer composition is selected from the group of polymers consisting of polyvinyl chloride, nylon, polypropylene, polyethylene, ethylene-propylene rubber, ethylene vinyl acetate copolymer, a polyacrylate, an ABS resin, and polystyrene.

4. The process of claim 1 wherein the cross-linking monomer is at least one of the thioesters corersponding to one of the formulae:

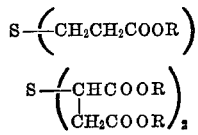

or

R'—S—CHCOOR
       |
       CH₂COOR wherein R represents allyl, methallyl, ethallyl or vinyl and R' represents alkyl, aryl or R.

5. The process of claim 1 wherein the thioester monomer is a thiodipropionate monomer.

6. The process of claim 1 wherein the thioester monomer is selected from the group of monomers consisting of:

thiobis(triallyl tricarballylate);
di(methallyl) 4-thia-1-heptene-6,7-dicarboxylate;
tetra(methallyl) 4-thiaheptane-1,2,6,7-tetracarboxylate;
tetra(ethallyl) thiodisuccinate;
diallyl phenylthiosuccinate;
diallyl 1-(pentachlorophenylthio)propane-2,3-dicarboxylate;
tetraallyl thiodisuccinate;
triallyl 2-thiabutane-1,3,4-tricarboxylate;
diallyl thiodipropionate;
tetraallyl thiodisuccinate;
divinyl thiodipropionate;
tetraallyl 4-thiaheptane-1,2,6,7-tetracarboxylate; and
dimethallyl thiodipropionate.

7. The process of claim 1 which includes blending a polymerizable comonomer into the polymer composition prior to cross-linking the composition.

8. The irradiated cross-linked polymer produced by the process of claim 1.

9. The process of preparing a cross-linking polyvinyl chloride polymer, which process comprises:
(a) providing a polyvinyl chloride polymer composition by blending a thiodipropionate cross-linking monomer into a polyvinyl chloride composition, the thioester monomer containing at least two reactive double bonds selected from the group consisting of allyl, methallyl, ethallyl and vinyl radicals, the polymer composition being free of a peroxide free-radical-inducing initiator compound; and, thereafter,
(b) exposing the polyvinyl chloride polymer composition to ionizing radiation in the amount of 1 to 20 megarads at a dosage rate of at least 0.1 megarad per hour.

10. The process of claim 9 wherein the thioester cross-linking monomer is diallyl thiodipropionate.

11. The process of claim 9 which includes exposing the polyvinyl chloride to ionizing radiation in the amount of from 1 to 5 megarads.

12. The irradiated cross-linked polyvinyl chloride polymer produced by the process of claim 9.

References Cited

UNITED STATES PATENTS 3,359,193   12/1967   Pinner _____ 204—159.17

OTHER REFERENCES

Chemical Abstracts, vol. 59, No. 10, November 1963, p. 11239d.

JOHN C. BLEUTGE, Primary Examiner

U.S. Cl. X.R.

204—159.15, 159.16, 159.22; 260—4 R, 78.5 UA, 78.5 E, 79.5 R, 79.7, 470, 481 R, 857 R, 873, 874, 876 R, 878 R, 880 R, 884, 885